DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 2, 1974

924 O.G. 7

T924,003

POWDER COATING COMPOSITIONS

Roy G. Foulk, 3620 Woodland Lane, and Homer R. Light, Jr., Rte. 5, 6324 Murrell Road, both of Kingsport, Tenn. 37660

Filed Sept. 24, 1973, Ser. No. 400,101

Int. Cl. C08b *21/06*

U.S. Cl. 260—17 R

No Drawing. 8 Pages Specification

Powder coating compositions which can be deposited on heatable substrates and thereafter coalesced to form a strongly adherent, continuous coating are produced from between about 45% and about 80% by weight of a polymer selected from the group consisting of acrylics, polyvinyl acetate and polyvinyl chloride, between about 10% and about 30% by weight of cellulose acetate butyrate and between about 0.3% and about 5% by weight of a compound of silicone.